US012742051B2

(12) United States Patent
Wang et al.

(10) Patent No.: US 12,742,051 B2
(45) Date of Patent: Sep. 22, 2026

(54) POROUS RESIN USED TO SOLID PHASE SYNTHESIS AND PREPARATION METHOD THEREFOR

(71) Applicant: SUNRESIN NEW MATERIALS CO. LTD., Shaanxi (CN)

(72) Inventors: Chaoyang Wang, Shaanxi (CN); Cheng Zhang, Shaanxi (CN); Dan Wu, Shaanxi (CN); Weijie Zhao, Shaanxi (CN); Yanjun Li, Shaanxi (CN); Qiong Liu, Shaanxi (CN); Xiaokang Kou, Shaanxi (CN)

(73) Assignee: SUNRESIN NEW MATERIALS CO. LTD., Shaanxi (CN)

( * ) Notice: Subject to any disclaimer, the term of this patent is extended or adjusted under 35 U.S.C. 154(b) by 874 days.

(21) Appl. No.: 18/043,786

(22) PCT Filed: Feb. 24, 2021

(86) PCT No.: PCT/CN2021/077663
§ 371 (c)(1),
(2) Date: Mar. 2, 2023

(87) PCT Pub. No.: WO2022/110560
PCT Pub. Date: Jun. 2, 2022

(65) Prior Publication Data

US 2023/0312859 A1 Oct. 5, 2023

(30) Foreign Application Priority Data

Nov. 26, 2020 (CN) ........................ 202011357390.X

(51) Int. Cl.

| | |
|---|---|
| ***C08J 9/28*** | (2006.01) |
| ***C08F 2/18*** | (2006.01) |
| ***C08F 222/34*** | (2006.01) |

(52) U.S. Cl.
CPC .................. *C08J 9/28* (2013.01); *C08F 2/18* (2013.01); *C08F 222/34* (2013.01);
(Continued)

(58) Field of Classification Search
CPC .. C08J 9/28; C08J 2201/026; C08J 2205/042; C08J 2325/12; C08J 9/36; C08F 2/18;
(Continued)

(56) References Cited

U.S. PATENT DOCUMENTS

| | | |
|---|---|---|
| 5,463,103 A | 10/1995 | Nishii et al. |
| 8,592,542 B2 | 11/2013 | Mori et al. |

(Continued)

FOREIGN PATENT DOCUMENTS

| | | |
|---|---|---|
| CN | 101076546 A | 11/2007 |
| CN | 101613430 A | 12/2009 |

(Continued)

OTHER PUBLICATIONS

James et al., "Dispersible microporous diblock copolymer nanoparticles via polymerisation-induced self-assembly," Polymer Chemistry, 2019, 10, 3879-3886 (Year: 2019).*

(Continued)

*Primary Examiner* — K. Boyle
(74) *Attorney, Agent, or Firm* — DINSMORE & SHOHL LLP

(57) ABSTRACT

A porous resin used to solid phase synthesis and a preparation method therefor, specifically being a porous resin having functional groups being an amino group or a hydroxyl group and a preparation method therefor. Using an olefin compound containing two cyano groups as a modified monomer, using a high internal phase emulsion as a pore-foaming agent, and performing suspension polymerization to prepare the porous resin. And then functionalizing the porous resin to obtain the porous resin having functional
(Continued)

groups being an amino group or a hydroxyl group. Different from the existing preparation method, the modified monomer can make the distribution of the functional groups more uniform, and make the swelling degrees of the porous resin in different solvents close. The high internal phase emulsion pore-foaming agent can make the pore size distribution of the carrier narrower. The porous resin can be used as a solid phase synthesis carrier to prepare an oligonucleotide, and the use of the carrier is beneficial for improving the yield and purity of the oligonucleotide.

20 Claims, 8 Drawing Sheets

(52) U.S. Cl.
CPC .... *C08J 2201/026* (2013.01); *C08J 2205/042* (2013.01); *C08J 2325/12* (2013.01)

(58) Field of Classification Search
CPC ...... C08F 222/34; C08F 2810/50; C08F 8/32; C08F 212/08; C08F 8/00; C08F 212/36; C08F 212/18; C08F 222/30; C08F 212/12; C08F 220/50; C08F 212/21; C08F 212/26; C08F 212/22; C08F 212/32; C07H 1/00; C07H 21/00; C07H 21/02; C08L 25/12; C08L 25/08
See application file for complete search history.

(56) References Cited

U.S. PATENT DOCUMENTS

| | | | |
|---|---|---|---|
| 8,652,152 B2 | 2/2014 | Mori et al. | |
| 8,653,152 B2 | 2/2014 | Mori et al. | |
| 2006/0051800 A1 | 3/2006 | Ravikumar et al. | |
| 2009/0286085 A1 | 11/2009 | Ravikumar et al. | |
| 2009/0326210 A1 | 12/2009 | Mori et al. | |
| 2011/0065818 A1 | 3/2011 | Mori et al. | |
| 2011/0065822 A1 | 3/2011 | Mori et al. | |
| 2012/0202124 A1 | 8/2012 | Jeon et al. | |
| 2013/0266797 A1 | 10/2013 | Teramoto et al. | |
| 2014/0073713 A1 | 3/2014 | Kim et al. | |
| 2016/0108158 A1* | 4/2016 | Nozoe .................. | C08F 212/10 526/300 |

FOREIGN PATENT DOCUMENTS

| | | | |
|---|---|---|---|
| CN | 102020812 | A | 4/2011 |
| CN | 102020813 | A | 4/2011 |
| CN | 103881016 | A | 6/2014 |
| CN | 103890085 | A | 6/2014 |
| CN | 106905533 | A | 6/2017 |
| EP | 2138519 | A1 | 12/2009 |
| JP | H06306037 | A | 11/1994 |
| JP | 2008-074979 | A | 4/2008 |
| JP | 2008511743 | A | 4/2008 |
| JP | 2010006888 | A | 1/2010 |
| JP | 2011063728 | A | 3/2011 |
| JP | 2013539905 | A | 10/2013 |
| JP | 2014141435 | A | 8/2014 |
| WO | 2006029023 | A2 | 3/2006 |

OTHER PUBLICATIONS

High polymer chemistry, Dec. 1, 1998, 2 pages.
First Office Action of Corresponding Korean Application No. 10-2023-7014306 Dated May 12, 2025, 18 pages.
First Office Action of Corresponding Japanese Application No. 2023-514051 Dated Feb. 20, 2024, 14 pages.
Extended European Search Report of Corresponding European Application No. 21896080.5 Dated Nov. 30, 2023, 6 pages.
First Office Action of Corresponding India Application No. 202337006142 Dated Sep. 21, 2023, 6 pages.
Hearing Notice of Corresponding India Application No. 202337006142 Dated Mar. 14, 2024, 2 pages.
First Office Action of Corresponding Russia Application No. 2023103704 Dated Aug. 22, 2023, 18 pages.
Notice of Reasons for Refusal of Corresponding Japanese Patent Application No. 2023-514051 Dated Aug. 23, 2024, 4 pages.
Babaev, Evigeny V., “Solid-phase synthesis for beginners: choice of tools and technique for multiple step transformations,” Russian Chemical Society, vol. LIII, No. 5, 2009, 32 pages.
First Office Action of CN2020100421222, Application No. 20 2011357 390.X dated Dec. 2, 2022, 12 pages.
International Search Report, PCT/CN2021/077663, dated Jul. 30, 2021, 2 pages.
Written Opinion, PCT/CN2021/077663, 2 pages.
Xie, et al., “Synthesis of microporous organic polymers via radical polymerization of fumaronitrile with divinylbenzene”, 6 pages.

* cited by examiner

POROUS RESIN USED TO SOLID PHASE SYNTHESIS AND PREPARATION METHOD THEREFOR

TECHNICAL FIELD

The invention relates to a porous resin and preparation method thereof. The carrier is for use in the solid phase synthesis of oligonucleotides and belongs to the field of preparation of functional polymer materials.

BACKGROUND

In the past decades, synthetic oligonucleotides have been widely used in targeted gene therapy. Oligonucleotides are short chain nucleotides with about 20 bases, including deoxyribonucleic acid (DNA) and ribonucleic acid (RNA). At present, oligonucleotides are often synthesized using chemical methods, and the most common method is solid phase phosphoramidite synthesis, in which a solid phase synthesis carrier is filled in a reaction column and a solution with dissolved reactants is rapidly flowed through the column under a certain pressure to complete the reaction. In order to improve the reaction efficiency and reduce the generation of impurities, the reactants in the solution should be quickly diffused into the solid phase synthesis carrier to react with active sites, and the products generated by the reaction can be quickly diffused into the solution and carried away. Therefore, the solid phase synthesis carriers are required to meet the following requirements: 1) The carriers must contain a single kind of active sites (or reactive groups) to which nucleic acid molecular chains can be attached and can be cleaved down after the synthesis is completed; 2) The carrier should maintain physical and chemical stability during the synthesis process; 3) The carrier should have a sufficiently large pore diameter and ideal pore size distribution to facilitate rapid and unimpeded contact between the growing nucleic acid molecular chains and the reagents; 4) The active sites should be uniformly distributed on the carrier to reduce the mutual interference between nucleic acid molecular chains; 5) The carrier skeleton should exhibit a certain degree of hydrophobicity, because the phosphoramidite monomer for oligonucleotide synthesis is sensitive to moisture which will lead to a decrease in reaction efficiency; 6) The carrier should have similar welling degrees in different solvents, thereby reducing the dead volume caused by the difference of swelling in the synthesis or washing process using different solvents, which is conducive to the uniform diffusion of reaction reagents and rapid washing and removal of reaction products.

At the early stage of the development of oligonucleotide solid phase synthesis technology, the commonly used solid phase synthesis carriers include inorganic particles such as controlled pore glass microspheres (CPG) and modified silica, but they have obvious drawbacks such as low loading (generally less than 100 μmmol/g), which leads to the limited yield of single batch of oligonucleotide, low equipment utilization and high production cost. In order to improve the loading of the carrier, Nitto Denko CO. LTD. and lonis Inc. jointly filed a patent application WO2006029023, which involved preparing organic polymers as carries for oligonucleotides solid phase synthesis, using styrene, 4-acetoxystyrene and divinylbenzene as polymerization monomers and isooctane and 2-ethyl -1-hexanol as pore forming agents. The prepared carrier had a loading of up to 100-350 μmmol/g, but had following disadvantages: the carrier had relatively strong non-polarity, and as a results the reaction efficiency was low when linker was connected with onium salt condensation system, and there was a large variation in resin volume when toluene and acetonitrile were used in the synthesis or washing process, resulting in a large dead volume in the reactor. In subsequent patent application U.S. Pat. No. 8,592,542 filed by Nitto Denko CO. LTD., styrene, 4-acetoxystyrene, divinylbenzene, and methacrylamide derivatives were used as polymerization monomers. In U.S. Pat. No. 8,653,152, styrene, 4-acetoxystyrene, divinylbenzene, and methacrylonitrile were used as polymerization monomers. Oligonucleotide solid phase synthesis carriers with a higher loading (more than 500 μmmol/g) were prepared by adding polar monomers in the polymerization process. Meanwhile, the adding of polar monomers facilitated the regulation of the swelling fluctuations of the carriers in different solvents (such as toluene, or acetonitrile). However, there were also problems: methacrylamide monomers and methacrylonitrile were more hydrophilic, and water added in the oxidation step was difficult to remove when washing with anhydrous solvent (anhydrous acetonitrile), thereby affecting the subsequent synthesis efficiency of oligonucleotide. In addition, the pore size distribution of the carrier obtained by solvent pore forming is not uniform and the mass transfer effect is poor, which will also affect the removal of water and the subsequent synthesis efficiency of oligonucleotide. In a patent application CN201210562165.9 filed by Nankai University, crosslinking polyacrylonitrile or crosslinking polymethacrylonitrile were used as the basic skeleton of the carrier. Active sites were introduced by adding vinyl acetate easter, acrylates or methacrylate esters monomers and introducing hydroxyl groups or amino groups by alkaline hydrolysis or by reaction with compounds containing two primary amine groups. In this patent application a large number of polar monomers were used, so that the problem of resin swelling difference in different solvents was solved. However, due to the use of a large number of hydrophilic monomers, the carrier was extremely hydrophilic, and it is more difficult to remove water from the carrier when washing with an anhydrous solvent (acetonitrile), thereby greatly affecting the subsequent synthesis efficiency of oligonucleotide.

Due to the great progress in the research of oligonucleotide drugs in recent years, more and more oligonucleotide drugs enter the clinical stage. The demand for oligonucleotide synthesis carriers is increasing, while the problems of mass transfer, swelling and polarity of the oligonucleotide carriers lead to low synthesis efficiency of oligonucleotide and high production cost. Therefore, it is extremely necessary to develop a porous resin so that oligonucleotide drugs can be synthesized in a large scale, low cost and high efficiency to meet the market demand for nucleotide drugs.

SUMMARY OF THE INVENTION

In order to achieve large-scale and low-cost production of oligonucleotides and overcome the disadvantages of prior carriers such as low mass transfer efficiency, incomplete washing process and large variation of swelling in different solvents, the present invention provides a porous resin for solid phase synthesis and preparation method thereof.

In order to improve mass transfer efficiency, the present invention aims to achieve a suitable pore diameter and a uniform pore size distribution. In present invention, a high internal phase emulsion is used as a template for pore forming, the pore diameter and distribution can be accurately controlled by the size of the emulsion droplets compared to traditional pore forming methods such as reversedphase method, phase separation method and solvent pore forming method. The size of the internal phase emulsion droplets can be determined by the molecular weight, HLB value and amount of the oil-soluble surfactant etc. The pore forming method of the present invention allows the carrier having a suitable pore diameter and a narrow pore size distribution, which is conducive to the diffusion of reaction reagents during the synthesis of oligonucleotides, thereby improving the reaction efficiency and reducing the generation of impurities.

Adding modified monomers in the polymerization process has four effects: First, the polymerization of the modified monomer is slow and thus not possible to undergo homopolymerization but only possible to undergo copolymerization with other monomers, which facilitates the uniform distribution of active sites. Second, adding a small amount of modified monomer can adjust the swelling performance of the resin in a wide range, reduce the volume variation for carrier swelling in different solvents, and reduce the dead volume in the reactor during the oligonucleotide synthesis. Third, the modified monomer molecular structure can make the onium salts condensation agent more efficient and ensure the efficiency of linker connection. Fourth, the modified monomer is more hydrophobic compared with methacrylamide monomers and methacrylonitrile, thereby reducing the mass transfer resistance of water in the carrier, reducing the impact of water on the oligonucleotide synthesis process, and improving the reaction efficiency and yield.

The present invention disclosed a porous resin for solid phase synthesis, wherein the porous resin has a polymer skeleton with functional groups which is represented by the following formula:

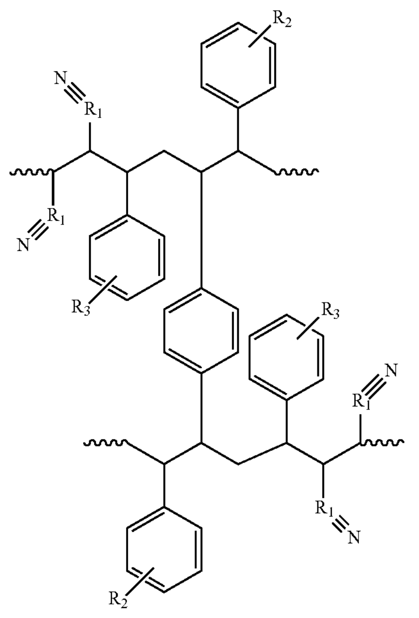

wherein,

R1=—C— or —C—CH2—,

R2=—OH, —CH2OH, —NH2, —CH2NH2, —CH2OOC—C6H4—OH, —CH2OOCCH$_2$—C6H4—OH, —(CH2)4OOC—C6H4—OH, —(CH2)4OOCCH2—C6H4—OH, —COONH—C6H4—NH2, —CH2COONH—C6H4—NH2, —COO—C6H4—OH or —CH2COO—C6H4—OH; and R3=—H; or CH3(CH2)n—, n is an integer of 0-4; or(CH3)2CH(CH2)n, n is an integer of 0-2; or (CH3)3C—; or CH3CH2CH(CH3)—; or CH3CH2C(CH3)2—; or CH3CH2CH2CH(CH3)—; or CH3(CH2)n—O—, n is an integer of 0-4.

In some embodiments, the porous resin for solid phase synthesis is a copolymer comprising repeating structural units represented by formula (I), formula (II), formula (III), and formula (IV) in its skeleton:

(I)

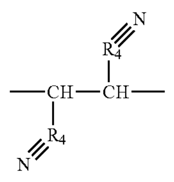

wherein, $R_4$=—C— or —C—$CH_2$—;

II)

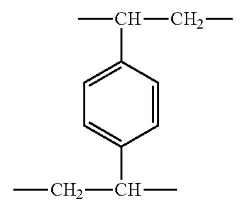

(III)

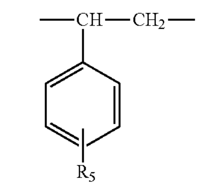

wherein, R5 is selected from the group consisting of —OH, —CH2OH, —NH2, —CH2NH2, —CH2OOC—C6H4—OH, —CH2OOCCH2—C6H4—OH, —(CH2)4OOC—C6H4—OH, —(CH2)4OOCCH2—C6H4—OH, —COONH—C6H4—NH2, —CH2COONH—C6H4—NH2, —COO—C6H4—OH and —CH2COO—C6H4—OH;

(IV)

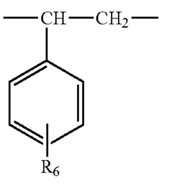

wherein, R6 is —H; or CH3(CH2)n—, n is an integer of 0-4; or (CH3)2CH(CH2)n—, n is an integer of 0-2; or (CH3)3C—; or CH3CH2CH(CH3)—; or CH3CH2C(CH3)2—; or CH3CH2CH2CH(CH3)—; or CH3(CH2)n—O—, n is an integer of 0-4.

In some embodiments, the porous resin for solid phase synthesis has a content of hydroxyl group or amino group of 100-1000 μmmol/g, preferably 400-700 μmmol/g.

In some embodiments, the porous resin for solid phase synthesis has a particle size in a range of 35-200 μm, preferably 50-100 μm.

In some embodiments, the porous resin has an average pore diameter of 10-200 nm, preferably 40-100 nm.

The present invention also disclosed a preparation method of the porous resin for solid phase synthesis. The preparation method comprises following steps of: preparing an aqueous phase and an oil phase, respectively, wherein the aqueous phase comprises: water, a dispersant and an inorganic salt; and the oil phase comprises: a monovinyl compound, a crosslinking monomer, a functional monomer, a modified monomer, an oil-soluble surfactant, a diluent and an initiator; and wherein, the monovinyl compound, the crosslinking monomer, the functional monomer and the modified monomer are monomers capable of polymerization; the oil-soluble surfactant and the diluent are incapable of polymerization but act as pore-forming agents for pore forming; adding the oil phase to the aqueous phase, stirring and heating to carry out reaction, and removing the pore-forming agents after the reaction is completed, obtaining a porous polymer resin. The porous polymer resin is capable of undergoing a further reaction to obtain a porous resin containing a hydroxyl group or an amino group as functional groups.

In some embodiments, the monovinyl compound is an aromatic monovinyl compound. The monovinyl compound is styrene, unsubstituted or substituted with C1-C5 alkyl on its benzene ring, such as methyl styrene, ethyl styrene, n-propyl styrene, isopropyl styrene, n-butyl styrene, isobutyl styrene, sec butyl styrene, tert butyl styrene, n-amyl styrene, isopentyl styrene, sec amyl styrene or tert amyl styrene; or styrene substituted with C1-C5 alkoxy on its benzene ring, such as methoxy styrene, ethoxy styrene, propoxy styrene, butoxy styrene or pentoxy styrene. Preferably, the monovinyl compound is styrene.

In some embodiments, the crosslinking monomer is a multifunctional monomer having two or more non conjugated vinyl groups. Preferably, the crosslinking monomer is divinylbenzene. The divinylbenzene is o-divinylbenzene, m-divinylbenzene, p-divinylbenzene or a mixture of the three.

In some embodiments, the functional monomer has a double bond capable of free radical polymerization, and also has a hydroxyl group, an amino group, a halogenated group or other group capable of converting into a hydroxyl group and an amino group via reaction. In the process of oligonucleotide synthesis, the reactive hydroxyl group or amino group can be used as the active site to connect oligonucleotides, including amino group, aminoalkyl group, hydroxyl group and hydroxyalkyl group etc. Primary amino group, aminomethyl group, hydroxyl group and hydroxymethyl group, etc. are preferred. The functional monomer comprises but is not limited to hydroxystyrene and derivatives thereof, such as 4-hydroxystyrene etc.; hydroxyalkyl styrene and derivatives thereof, such as 4-hydroxymethyl styrene etc.; acyloxy styrene and derivatives thereof, such as 4-acetoxystyrene and benzoyloxy styrene etc.; amino styrene and derivatives thereof, such as 4-amino styrene etc.; aminoalkyl styrene and derivatives thereof, such as 4-aminomethyl styrene etc.; haloalkyl styrene monomers, such as 4-(4-bromobutyl) styrene and 4-chloromethyl styrene etc.; 4-vinylphenyl ester monomers, such as methyl 4-vinylbenzoate and 4-ethenylbenzeneacetic acid ethyl ester etc..

In some embodiments, some of the functional monomers contain hydroxyl protection groups or amino protection groups, which can be directly cut off to form amino groups or hydroxyl groups. For example, acyloxy styrene can be converted into hydroxyl group as the active sites for connecting oligonucleotides by alkali hydrolysis or acid hydrolysis; Some of the functional monomers need to be converted into amino groups or hydroxyl groups as active sites through functionalization reaction. For example, haloalkyl styrene can be converted into hydroxyl group through hydrolysis or converted into primary amino groups through Gabriel reaction as active sites for connecting oligonucleotides; Some of the functional monomers need to link connecting arms having amino or hydroxyl groups as active sites. For example, haloalkyl styrene can react with 4-hydroxybenzoic acid or 4-hydroxyphenylacetic acid to generate hydroxyl groups as active sites for connecting oligonucleotides; Some of the functional monomers need the above multiple reactions to obtain amino groups or hydroxyl groups as active sites. For example, 4-vinylphenyl esters monomers need to hydrolyze to expose carboxyl groups first, and then react with hydroquinone or p-phenylenediamine to obtain amino groups or hydroxyl groups as active sites.

In some embodiments, the modified monomer has a double bond capable of free radical polymerization and two cyano groups. It cannot undergo homopolymerization, but can only undergo copolymerization with other monomers. The modified monomer comprises but is not limited to fumaronitrile and 1,4-dicyano-2-butene, etc. Preferably, the modified monomer is fumaronitrile.

In some embodiments, the initiator is selected from the group consisting of organic peroxides and azo compounds. The initiator comprises but is not limited to benzoyl peroxide, lauroyl peroxide, tert butyl peroxy-2-ethylhexanoate, 2,2'-azobis(2-methylpropionitrile), 2,2'-azobis(2-methylbutyronitrile) and 2,2'-azobis(2,4-dimethyl)valeronitrile. The initiator accounts for 0.5-5% by weight based on a total weight of the monomers.

In some embodiments, the oil-soluble surfactant is not polymerizable but is insoluble or slightly soluble in water. The oil-soluble surfactant comprises but is not limited to sorbitan trioleate, polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, polyoxyethylene sorbitol oleate, monostearin, lanolin hydroxylated, sorbitol monooleate, propylene glycol laurate, and any combinations thereof. The diluent is an organic solvent which is not polymerizable but is insoluble or slightly soluble in water. The diluent comprises but is not limited to aromatic hydrocarbons such as benzene, toluene and ethylbenzene etc.; aliphatic hydrocarbons, such as C6-C12 linear or branched alkanes or C6-C12 cycloalkanes, such as hexane, heptane, octane, dodecane, isooctane, isododecane and cyclohexane, etc; halogenated hydrocarbons such as chloroform and chlorobenzene; esters containing 4 or more carbon atoms, such as ethyl acetate, butyl acetate, dibutyl phthalate, etc; alcohols, such as C4-C12 linear or branched alkane alcohol or C4-C12 cycloalkane alcohol, such as hexanol, cyclohexanol, octanol, isooctanol, decanol and dodecanol. The oil-soluble surfactant and the diluent are incapable of polymerization but act as pore-forming agents for pore forming;

In some embodiments, the aqueous phase comprises water, a dispersant and an inorganic salt. The dispersant is water-soluble polymer which comprises but is not limited to one or more selected from the group consisting of polyvinyl alcohol, hydroxyethyl cellulose, hydroxyethyl methyl cellulose, carboxymethyl cellulose, methyl cellulose, ethyl cellulose, sodium polyacrylate and polyvinylpyrrolidone. The dispersant is present in the aqueous phase in an amount of 0.1-5% by weight. The inorganic salt acts to regulate the density of the aqueous phase, while reducing the solubility of the components of the oil phase in the aqueous phase, so that the oil droplets are more stably dispersed in the aqueous phase. The inorganic salt comprises but is not limited to one or more selected from the group consisting of sodium chloride, potassium chloride, calcium chloride, sodium sulfate, potassium sulfate and calcium sulfate, etc. The inorganic salt is present in the aqueous phase in an amount of 20% by weight or lower.

In some embodiments, in order to reduce the bonding between resins and improve the heat transfer of polymerization, as well as to improve equipment utilization and production efficiency, the weight ratio of oil phase to aqueous phase is set to 1:3-1:20.

In some embodiments of the present invention, the different components are present in the following amounts: the monovinyl compound initially present in the oil phase accounts for 40-95.9% by weight based on a total weight of the monomers; the crosslinking monomer initially present in the oil phase accounts for 2-20% by weight based on a total weight of the monomers; the functional monomer initially present in the oil phase accounts for 2-20% by weight based on a total weight of the monomers; the modified monomer initially present in the oil phase accounts for 0.1-20% by weight based on a total weight of the monomers; the pore-forming agents initially present in the oil phase account for 15-70% by weight based on a total weight of the monomers; the oil-soluble surfactant accounts for 0.1-15% by weight based on a total weight of the pore-forming agents; and the diluent accounts for 85-99.9% by weight based on a total weight of the pore-forming agents.

In some more preferred embodiments of the present invention, the different components are present in the following amounts: the monovinyl compound initially present in the oil phase accounts for 60-88% by weight based on a total weight of the monomers; the crosslinking monomer initially present in the oil phase accounts for 5-15% by weight based on a total weight of the monomers; the functional monomer initially present in the oil phase accounts for 5-15% by weight based on a total weight of the monomers; the modified monomer initially present in the oil phase accounts for 2-10% by weight based on a total weight of the monomers; and the pore-forming agents initially present in the oil phase account for 25-50% by weight based on a total weight of the monomers.

In some embodiments, the polymerization is carried out at a temperature of 50-90° C., preferably, 60-85° C.

In some embodiments, the preparation method of porous resin for solid phase synthesis comprises following steps of:

- adding a certain amount of purified water to a reactor, adding the dispersant in an amount which is 0.1-5% by weight of the aqueous phase and the inorganic salt in an amount which is not more than 20% by weight of the aqueous phase, and dissolving to obtain the aqueous phase;
- weighing out the monovinyl compound, crosslinking monomer, functional monomer, modified monomer, pore-forming agents and initiator according to a weight ratio of the oil phase to the aqueous phase being 1:3-1:20; wherein, the monovinyl compound accounts for 40-95.9% of the total weight of the monomers, the crosslinking monomer accounts for 2-20% of the total weight of the monomers, the functional monomer accounts for 2-20% of the total weight of the monomers, and the modified monomer accounts for 0.1-20% of the total weight of the monomers, the pore-forming agents account for 15-70% of the total weight of the monomers; the oil-soluble surfactant in the pore-forming agents accounts for 0.1-15% of the weight of the pore-forming agents; and the diluent accounts for 85-99.9% of the weight of the pore-forming agents, and mixing well to obtain the oil phase;
- adding the oil phase to the reactor, stirring and heating to 50-90° C. to carry out reaction; removing the pore-forming agents after the reaction is completed, screening and collecting the resin with appropriate particle size, and vacuum drying to obtain a porous polymer resin;
- carrying out a further reaction with the resin to obtain a porous resin having amino group or carboxyl group.

In some embodiments, the preparation method of porous resin for solid phase synthesis comprises following steps of:

- adding a certain amount of purified water to a reactor, adding the dispersant in an amount which is 0.1-5% by weight of the aqueous phase and the inorganic salt in an amount which is not more than 20% by weight of the aqueous phase, and dissolving to obtain the aqueous phase;
- weighing out the monovinyl compound, crosslinking monomer, functional monomer, modified monomer, pore-forming agents and initiator according to a weight ratio of the oil phase to the aqueous phase being 1:3-1:20; wherein, the monovinyl compound accounts for 60-88% of the total weight of the monomers, the crosslinking monomer accounts for 5-15% of the total weight of the monomers, the functional monomer accounts for 5-15% of the total weight of the monomers, and the modified monomer accounts for 2-10% of the total weight of the monomers, the pore-forming agents account for 25-50% of the total weight of the monomers; the oil-soluble surfactant in the pore-forming agents accounts for 0.1-15% of the weight of the pore-forming agents; and the diluent accounts for 85-99.9% of the weight of the pore-forming agents, and mixing well to obtain the oil phase;
- adding the oil phase to the reactor, stirring and heating to 60-85° C. to carry out reaction; removing the pore-forming agents after the reaction is completed, screening and collecting the resin with appropriate particle size, and vacuum drying to obtain a porous polymer resin;
- carrying out a further reaction with the resin to obtain a porous resin having amino group or carboxyl group.

The above method enables to obtain the porous resin for solid phase synthesis of the present invention, i.e., a porous resin having hydroxyl groups or amino groups. In the present invention, the content of amino group or hydroxyl group, i.e., the loading, can be calculated by reacting with Fmoc-Leu-OH and then removing the Fmoc protecting group. The amount of Fmoc removed is determined by colorimetric method, and then the content of amino group or hydroxyl group in the porous resin is calculated.

In some embodiments, the detailed operation is as follows: 1.0 g of carrier is accurately weighed and suspended in 7 ml of acetonitrile solution, then 0.5 g of Fmoc-Leu-OH, 0.5 g of HBTU and 0.5 ml of DIEA are added thereto, and stirred at room temperature to carry out reaction for 2 h. After the reaction is completed, the resin is washed successively with acetonitrile (10 ml for each time, three times) and methanol (10 ml for each time, three times), and then the resin is dried. 0.1000 g of resin is weighed accurately, suspended in 20% piperidine/DMF (v/v) solution, and shaken for 30 min at room temperature, filtered, and the filtrate is collected. The resin is washed with DMF and the filtrate is collected. The filtrates are combined to provide a total volume, and then diluted appropriate times to measure the absorbance at 300 nm. Similar Fmoc removal reactions are carried out by using a series of known concentrations of Fmoc-Leu-OH and the absorbance are measured to make a standard curve. The content of amino group or hydroxyl group in the porous resin is calculated via the standard curve.

Loading of the porous resin depends on the percentages of the functional monomers based on a total weight of the monomers, and a series of porous resins with different loading can be obtained by adjusting the amount of functional monomers. The loading of the porous resin determines the amount of synthesized oligonucleotides; If the loading is too low, the yield of oligonucleotides in a single batch will be reduced; and if the loading is too high, the purity of oligonucleotides will be affected. In the present invention, the loading of the porous resin ranges from 100-1000 μmmol/g, preferably 400-700 μmmol/g.

The particle size of the porous resin in present invention is measured by particle image processing instrument. The porous resin is uniformly distributed on a slide, and observed under a microscope at magnification, while images of the porous resin particles under magnification are captured by a camera. Morphological features and particle size of the porous resin are analyzed and calculated by a computer.

The particle size of the porous resins mainly depends on the type and amount of dispersant present in the aqueous phase, the type and amount of pore-forming agents and the speed of stirring during the suspension polymerization. The particle size of the porous resin can be regulated by adjusting above conditions. If the particle size of the porous resin is too large, on the one hand, it will lead to the decrease of the specific surface area of the carrier and the increase of the number of active sites per unit area, which will affect the purity of oligonucleotide; on the other hand, if the particle size is too large, it will slow down the mass transfer rate and lead to the increase of impurities during the synthesis of oligonucleotides. If the particle size of the porous resin is too small, it will cause too high pressure in the synthesis process and greatly increase the cost of equipment. In the present invention, the porous resin has a particle size in a range of 35-200 μm, preferably 50-100 μm. The average pore diameter of the porous resin is measured by mercury intrusion method. 0.1500-0.3000 g samples are precisely weighed and put into an automatic mercury porosimeter AutoPore IV 9500 (Micromeritics Instrument Co.). The contact angle of mercury is set to 130° and surface tension is set to 485 dyn/cm, and then measured by mercury intrusion method under these conditions. The average pore diameter of porous resin mainly depends on the type and amount of pore-form ing agents, the amount of crosslinking agent, the reaction temperature and time, etc. The average pore diameter of the porous resin can be regulated by adjusting these conditions. If the average pore diameter of the porous resin is too small, it will cause difficulties in mass transfer and affect the synthesis efficiency; if the average pore diameter of the porous resin is too large, it will lead to the decrease of the specific surface area of the porous resin and the increase of the active sites per unit area. During oligonucleotide synthesis, nucleoside growth will cause mutual influence and affect oligonucleotide purity. In the present invention, the porous resin has an average pore diameter of 10-200 nm, preferably 40-100 μm.

Compared with prior art, the present invention has four main advantages: First, the modified monomer can regulate the polymerization rate and facilitate the uniform distribution of active sites. Second, the swelling performance of the resin is regulated to reduce the volume variation of the swelling of the carrier in different solvents. Third, two cyano groups in the molecular structure of the monomer make the onium salts condensation agent more efficient and ensure the efficiency of linker connection. Fourth, compared with U.S. Pat. No. 8,592,542 where methacrylamide monomers were used and U.S. Pat. No. 8,653,152 where methacrylonitrile were used as a "modified monomer", the modified monomer used in the present invention is more hydrophobic, so that the trace amount of water remaining in the porous resin can be quickly removed during the washing process, thereby reducing the influence of water on the oligonucleotide synthesis process and improving the efficiency and yield of the reaction. At the same time, the present invention uses oil-soluble surfactants and water-in-oil emulsion droplets as templates for pore forming, so that the pore diameter and pore size distribution of the carrier can be accurately controlled, thereby facilitating the diffusion of reaction reagents, improving the reaction efficiency and reducing the generation of impurities.

DETAILED DESCRIPTION OF THE EMBODIMENTS

Figure 1:
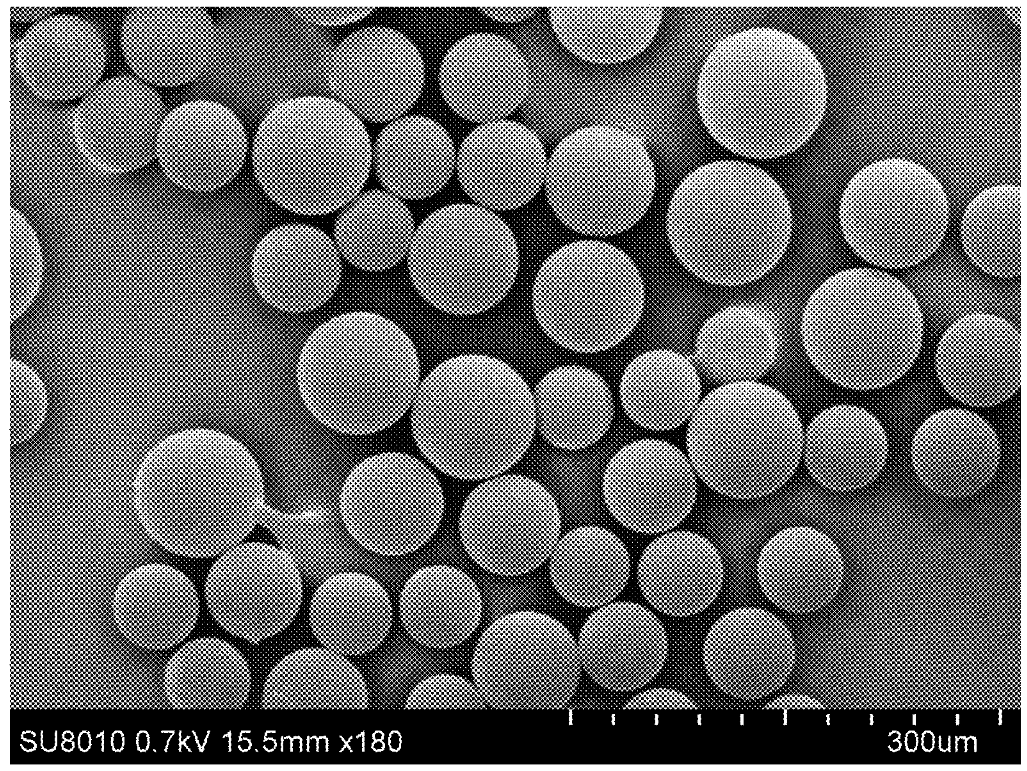
FIG. 1 shows a scanning electron microscope image of the carrier in Example 1.
Figure 2:
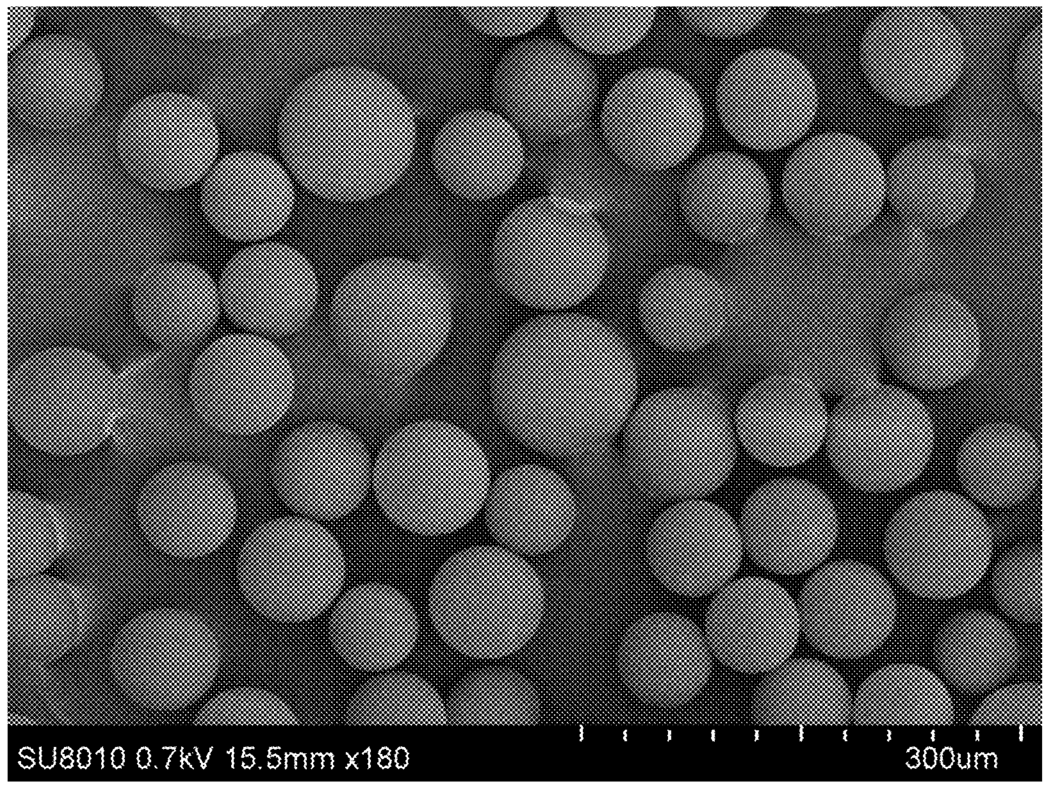
FIG. 2 shows a scanning electron microscope image of the carrier in Example 2.
Figure 3:
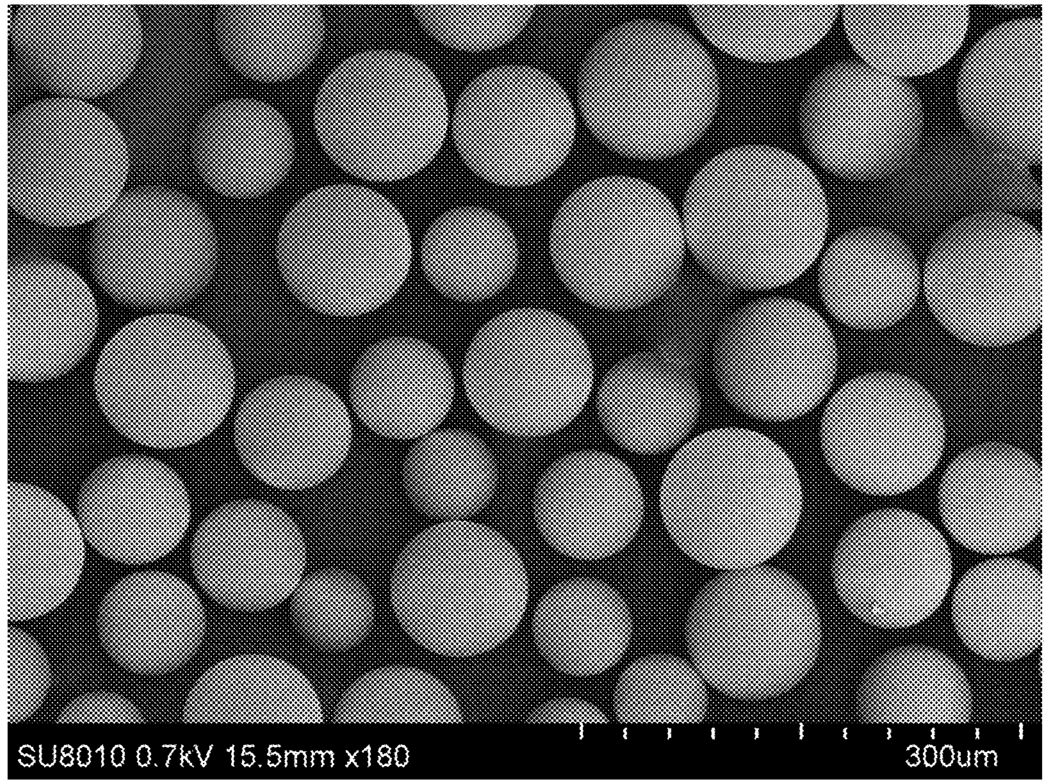
FIG. 3 shows a scanning electron microscope image of the carrier in Example 6.
Figure 4:
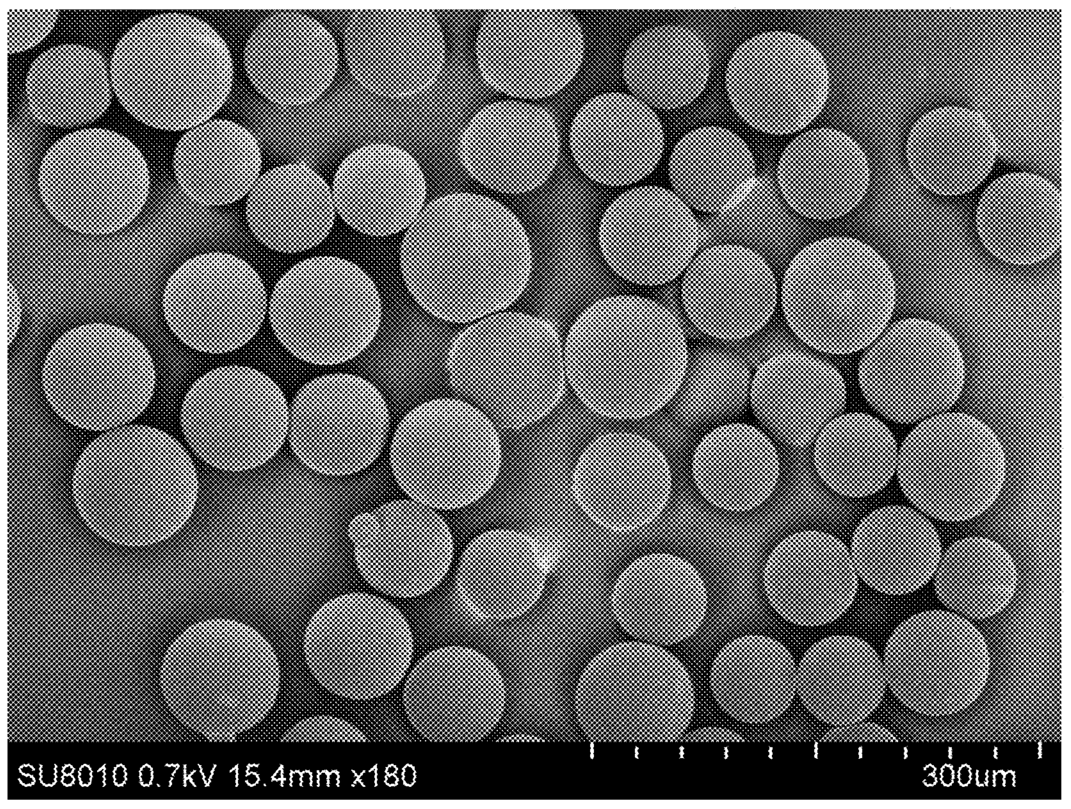
FIG. 4 shows a scanning electron microscope image of the carrier in Example 9.
Figure 5:
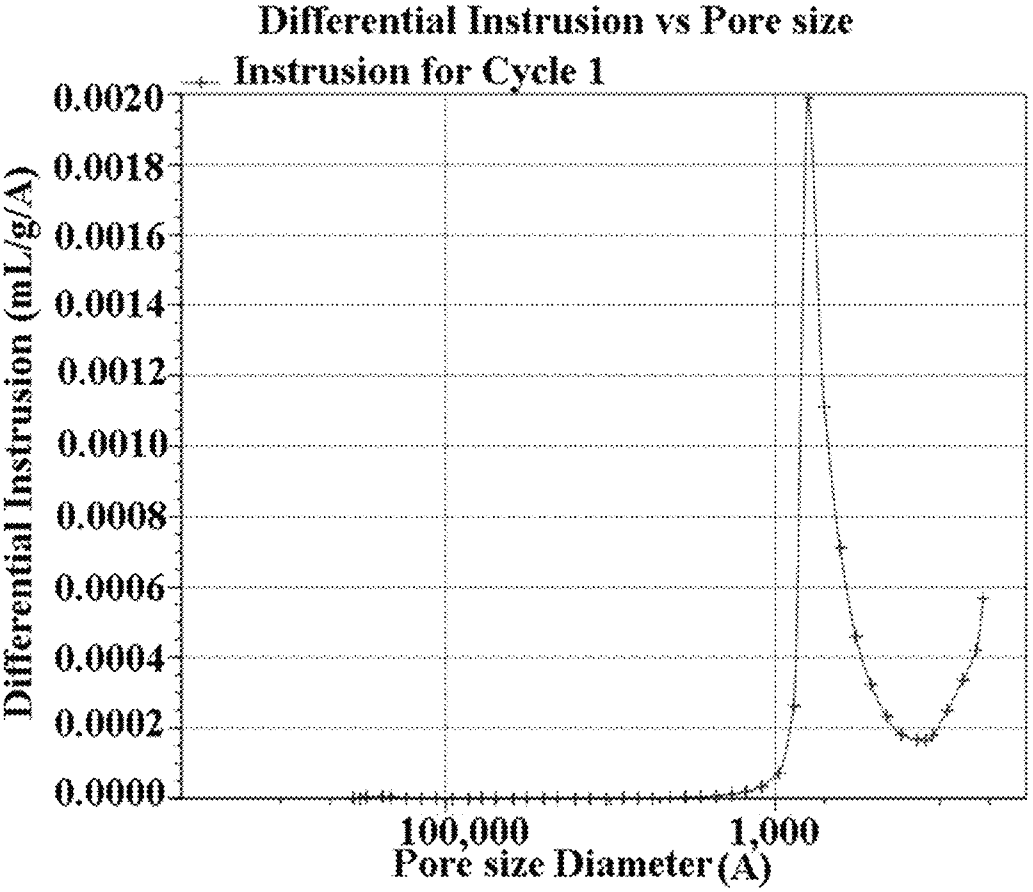
FIG. 5 shows the pore size distribution of the carrier in Example 1 measured by mercury intrusion method.
Figure 6:
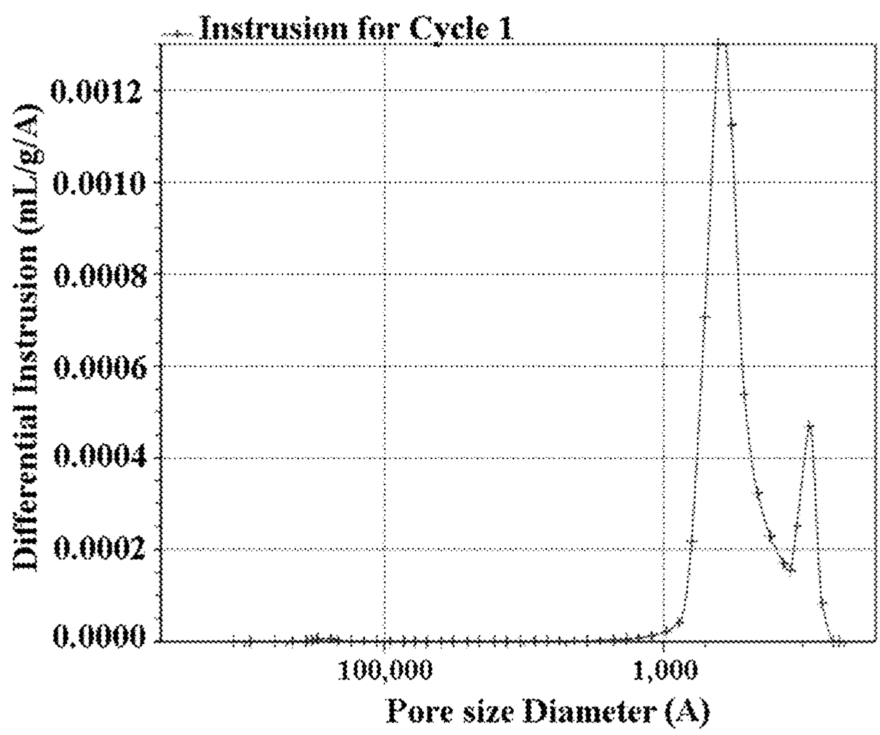
FIG. 6 shows the pore size distribution of the carrier in Example 2 measured by mercury intrusion method.
Figure 7:
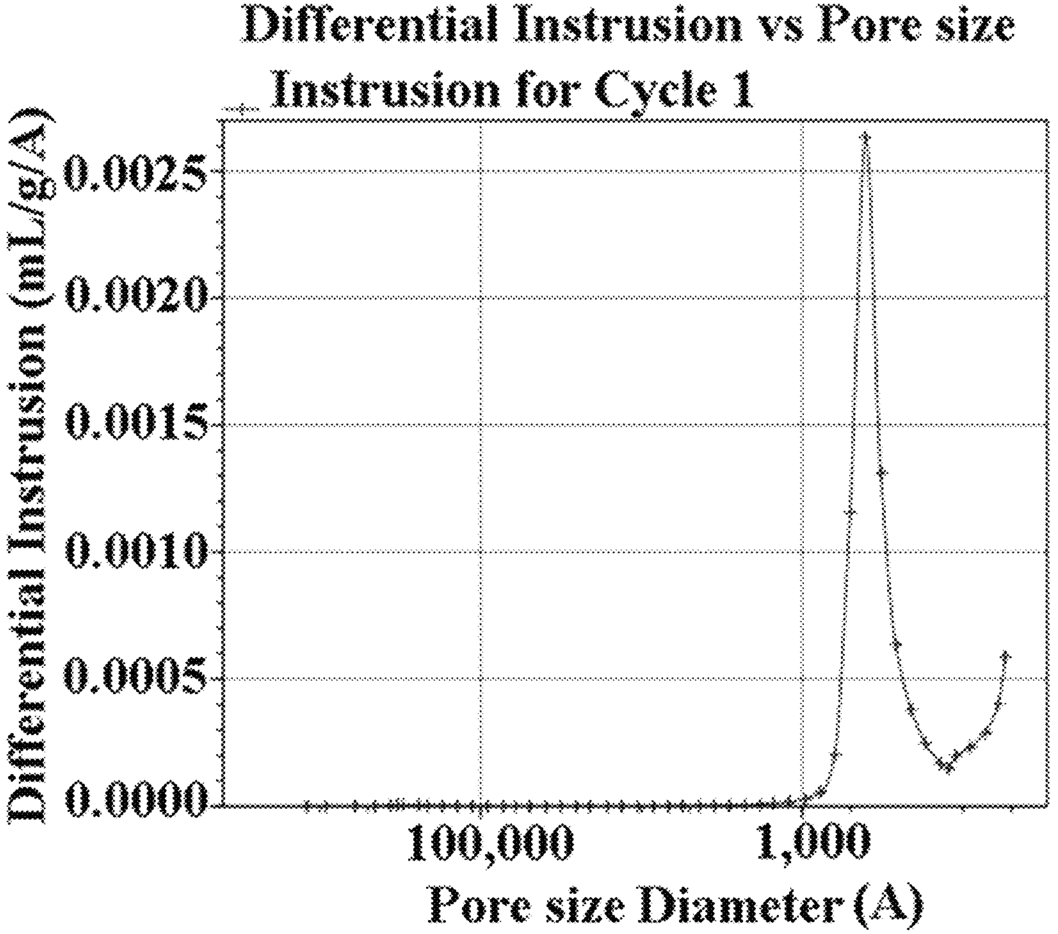
FIG. 7 shows the pore size distribution of the carrier in Example 6 measured by mercury intrusion method.
Figure 8:
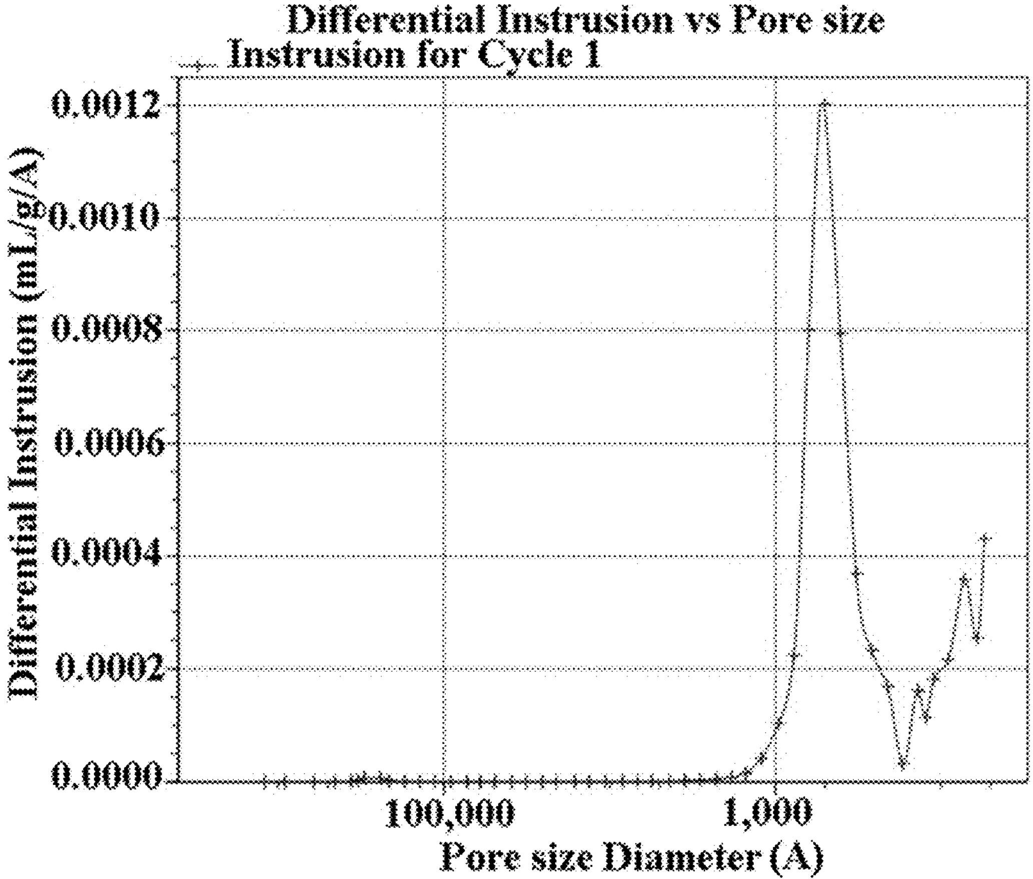
FIG. 8 shows the pore size distribution of the carrier in Example 9 measured by mercury intrusion method.

The present application will be further illustrated with reference to following embodiments. However, these embodiments are only for illustrating, rather than limitations to the present invention detailed in the claims.

Example 1

2 L purified water, 20 g polyvinyl alcohol and 60 g sodium chloride are added to a 3 L reactor equipped with a condenser, an agitator and a thermometer, and dissolved to obtain an aqueous phase. 110 g styrene, 10 g divinylbenzene (80% by weight), 12 g p-chloromethyl styrene, 8 g fumaronitrile, 5 g sorbitol monooleate, 45 g isooctanol and 2.5 g benzoyl peroxide are weighed out and mixed well to obtain an oil phase. The oil phase is added to the reactor, stirred and heated to 80° C. to carry out polymerization for 4 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin with a chlorine content of 550 μmmol/g.

50 g of the polymer porous resin and 500 ml N,N-dimethylformamide are added to a 1 L reactor equipped with a condenser, an agitator and a thermometer, and stirred. Then 30 g potassium phthalimide is added and the temperature is raised to 95° C. to carry out reaction for 16 hours. Cool to room temperature after reaction is completed, wash twice with N,N-dimethylformamide, wash to neutral with purified water, and wash three times with absolute ethanol, and then filter and dry the resin. 200 g absolute ethanol and 50 g hydrazine hydrate are added to the reactor and heated to a temperature of 75° C. to carry out reaction for 16 hours. Thereafter wash three times with ethanol/purified water solution with a volume ratio of 50:50, wash with purified water to neutral, wash three times with absolute ethanol, and filter and dry the resin. 200 g absolute ethanol and 50 g concentrated hydrochloric acid are added to the reactor and heated to a temperature of 60° C. to carry out reaction for 6 h. Thereafter cool to room temperature, wash to neutral with water, and then vacuum dry to obtain a solid phase synthesis carrier with an amino content of 543 μmmol/g and an average pore diameter of 48 nm measured by mercury intrusion method.

Example 2

2 L purified water, 20 g polyvinyl alcohol and 60 g sodium chloride are added to a 3 L reactor equipped with a condenser, an agitator and a thermometer, and dissolved to obtain an aqueous phase. 70 g methyl styrene, 28 g divinylbenzene (80% by weight), 14 g p-chloromethyl styrene, 28 g 1,4-dicyano-2-butene, 6 g sorbitan trioleate, 45 g isooctanol, 30 g toluene and and 1 g benzoyl peroxide are weighed out and mixed well to obtain an oil phase. The oil phase is added to the reactor, stirred and heated to 70° C. to carry out polymerization for 8 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin with a chlorine content of 660 μmmol/g.

50 g of the polymer porous resin and 500 ml N,N-dimethylformamide are added to a 1 L reactor equipped with a condenser, an agitator and a thermometer, and stirred. Then 35 g potassium phthalimide is added and the temperature is raised to 95° C. to carry out reaction for 16 hours. Cool to room temperature after reaction is completed, wash twice with N,N-dimethylformamide, wash to neutral with purified water, and wash three times with absolute ethanol, and then filter and dry the resin. 200 g absolute ethanol and 50 g hydrazine hydrate are added to the reactor and heated to a temperature of 75° C. to carry out reaction for 16 hours. Thereafter wash three times with ethanol/purified water solution with a volume ratio of 50:50, wash with purified water to neutral, and wash three times with absolute ethanol, and then filter and dry the resin. 200 g absolute ethanol and 50 g concentrated hydrochloric acid are added to the reactor and heated to a temperature of 60° C. to carry out reaction for 6 h. Thereafter cool to room temperature, wash to neutral with water, and then vacuum dry to obtain a solid phase synthesis carrier with an amino content of 650 μmmol/g and an average pore diameter of 132 nm measured by mercury intrusion method.

Example 3

2 L purified water, 20 g polyvinyl alcohol and 60 g sodium chloride are added to a 3 L reactor equipped with a condenser, an agitator and a thermometer, and dissolved to obtain an aqueous phase. 127 g ethyl styrene, 4 g divinylbenzene (80% by weight), 8.8 g 4-(4-bromobutyl) styrene, 0.2 g fumaronitrile, 1 g polyoxyethylene sorbitol beeswax derivative, 12 g isooctanol, 12 g dibutyl phthalate and 2.5 g benzoyl peroxide are weighed out and mixed well to obtain an oil phase. The oil phase is added to the reactor, stirred and heated to 65° C. to carry out polymerization for 10 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin with a bromine content of 265 μmmol/g.

50 g of the polymer porous resin and 600 ml N,N-dimethylformamide are added to a 1 L reactor equipped with a condenser, an agitator and a thermometer, and stirred. Then 5.4 g p-hydroxybenzoic acid, 5.4 g anhydrous potassium carbonate and 0.3 g potassium iodide are added and heated to a temperature of 75° C. to carry out reaction for 6 hours. Cool to room temperature after reaction is completed, wash to neutral with purified water, and then vacuum dry to obtain a solid phase synthesis carrier having a hydroxyl group content of 250 μmmol/g and an average pore diameter of 23 nm measured by mercury intrusion method.

Example 4

2 L purified water, 20 g polyvinyl alcohol and 60 g sodium chloride are added to a 3 L reactor equipped with a condenser, an agitator and a thermometer, and dissolved to obtain an aqueous phase. 110 g styrene, 11 g divinylbenzene (80% by weight), 9 g p-chloromethyl styrene, 10 g fumaronitrile, 0.5 g sorbitan tristearate, 20 g toluene and, 40 g dibutyl phthalate and 1 g benzoyl peroxide are weighed out and mixed well to obtain an oil phase. The oil phase is added to the reactor, stirred and heated to 60° C. to carry out polymerization for 7 h. Wash with hot water after the polymerization is completed. The pore-forming agents are removed by ethanol reflux extraction. Resin with a particle size of 50-100 μm are screened out and collected, and thereafter vacuum dried to obtain a polymer porous resin with a chlorine content of 425 μmol/g. 50 g of the polymer porous resin and 300 ml absolute ethanol are added to a 1 L reactor equipped with a condenser, an agitator and a thermometer, and stirred. 30 g of sodium hydroxide are weighed in a beaker, dissolved with 300 ml of deionized water and slowly added to the reactor. The temperature is raised to 65° C. to carry out reaction for 6 hours. Cool to room temperature after reaction is completed, wash to neutral with purified water, and then vacuum dry to obtain a solid phase synthesis carrier having a hydroxyl group content of 420 μmmol/g and an average pore diameter of 43 nm measured by mercury intrusion method.

Example 5

2 L purified water, 20 g polyvinyl alcohol and 60 g sodium chloride are added to a 3 L reactor equipped with a condenser, an agitator and a thermometer, and dissolved to obtain an aqueous phase. 83 g styrene, 25 g divinylbenzene (80% by weight), 18 g N-(4-vinyl-phenyl)-acetamide, 14 g fumaronitrile, 3 g sorbitan tristearate, 16 g isooctanol, 8 g isododecane and 2 g benzoyl peroxide are weighed out and mixed well to obtain an oil phase. The oil phase is added to the reactor, stirred and heated to 55° C. to carry out polymerization for 10 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin.

50 g of the polymer porous resin and 300 ml absolute ethanol are added to a 1 L reactor equipped with a condenser, an agitator and a thermometer, and stirred. 30 g of sodium hydroxide are weighed in a beaker, dissolved with 300 ml of deionized water and slowly added to the reactor. The temperature is raised to 65° C. to carry out reaction for 6 hours. Cool to room temperature after reaction is completed, wash to neutral with purified water, and then vacuum dry to obtain a solid phase synthesis carrier having an amino group content of 840 μmmol/g and an average pore diameter of 43 nm measured by mercury intrusion method.

Example 6

2 L purified water, 20 g polyvinyl alcohol and 60 g sodium chloride are added to a 3 L reactor equipped with a condenser, an agitator and a thermometer, and dissolved to obtain an aqueous phase. 111 g styrene, 11 g divinylbenzene (80% by weight), 13 g 4-acetoxystyrene, 5 g fumaronitrile, 8 g sorbitol monooleate, 40 g isooctanol, 20 g isododecane and 2.5 g benzoyl peroxide are weighed out and mixed well to obtain an oil phase. The oil phase is added to the reactor, stirred and heated to 78° C. to carry out polymerization for 6 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin.

50 g of the polymer porous resin and 300 ml acetonitrile are added to a 1 L reactor equipped with a condenser, an agitator and a thermometer, and stirred. 7.5 ml hydrazine hydrate is added slowly to carry out reaction for 3 h at room temperature. Thereafter wash to neutral with water, and then vacuum dry to obtain a solid phase synthesis carrier having a hydroxyl group content of 550 μmmol/g and an average pore diameter of 64 nm measured by mercury intrusion method.

Example 7

2 L purified water, 20 g polyvinyl alcohol and 60 g sodium chloride are added to a 3 L reactor equipped with a condenser, an agitator and a thermometer, and dissolved to obtain an aqueous phase. 130 g styrene, 5 g divinylbenzene (80% by weight), 4 g 4-acetoxystyrene, 1 g fumaronitrile, 1 g propylene glycol fatty acid ester, 40 g isooctanol, 10 g toluene and 3.5 g benzoyl peroxide are weighed out and mixed well to obtain an oil phase. The oil phase is added to the reactor, stirred and heated to 70° C. to carry out polymerization for 6 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin.

50 g of the polymer porous resin and 300 ml acetonitrile are added to a 1 L reactor equipped with a condenser, an agitator and a thermometer, and stirred. 7.5 ml hydrazine hydrate is added slowly to carry out reaction for 3 h at room temperature. Thereafter wash to neutral with water, and then vacuum dry to obtain a solid phase synthesis carrier having a hydroxyl group content of 175 μmmol/g and an average pore diameter of 53 nm measured by mercury intrusion method.

Example 8

2 L purified water, 20 g polyvinyl alcohol and 60 g sodium chloride are added to a 3 L reactor equipped with a condenser, an agitator and a thermometer, and dissolved to obtain an aqueous phase. 72 g styrene, 28 g divinylbenzene (80% by weight), 27 g benzoyloxy styrene, 13 g fumaronitrile, 5 g lanolin hydroxylated, 10 g toluene and 20 g dibutyl phthalate and 3 g benzoyl peroxide are weighed out, and mixed well to obtain an oil phase. The oil phase is added to the reactor, stirred and heated to 80° C. to carry out polymerization for 6 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin.

50 g of the polymer porous resin and 300 ml acetonitrile are added to a 1 L reactor equipped with a condenser, an agitator and a thermometer, and stirred. 7.5 ml hydrazine hydrate is added slowly to carry out reaction for 3 h at room temperature. Thereafter wash to neutral with water, and then vacuum dry to obtain a solid phase synthesis carrier having a hydroxyl group content of 852 μmmol/g and an average pore diameter of 47 nm measured by mercury intrusion method.

Example 9

2 L purified water, 20 g polyvinyl alcohol and 60 g sodium chloride are added to a 3 L reactor equipped with a condenser, an agitator and a thermometer, and dissolved to obtain an aqueous phase. 85 g styrene, 24 g divinylbenzene (80% by weight), 18 g methyl 4-vinylbenzoate, 13 g fumaronitrile, 4 g polyoxyethylene sorbitol oleate, 40 g isododecane, 40 g dibutyl phthalate and 2.5 g benzoyl peroxide are weighed out and mixed well to obtain an oil phase. The oil phase is added to the reactor, stirred and heated to 70° C. to carry out polymerization for 6 h. Wash with hot water after the polymerization is completed. The pore-forming agents are removed by ethanol reflux extraction. Resin with a particle size of 50-100 μm is screened out and collected, and thereafter vacuum dried to obtain a polymer porous resin.

50 g of the polymer porous resin and 300 ml acetonitrile are added to a 1 L reactor equipped with a condenser, an agitator and a thermometer, and stirred. 8.8 g of hydroquinone, 23 g of HBTU and 13 ml of DIEA are added to carry out reaction for 2 h at room temperature. Thereafter wash to neutral with water, and then vacuum dry to obtain a solid phase synthesis carrier having a hydroxyl group content of 735 μmmol/g and an average pore diameter of 143 nm measured by mercury intrusion method.

Example 10

Swelling properties of the solid phase synthesis carriers prepared in Examples 1-9 in acetonitrile and toluene are measured, respectively. The method is as follows: About 1.5 g of the sample are weighed and put into a stoppered measuring cylinder. Toluene or acetonitrile are added to the corresponding scale. Then the resins and solvent are stirred with a glass rod to make it fully swell and tighten the stopper. 2-3 hours later, the resins are stirred slowly with a glass rod to remove the air bubbles and make the resin uniformly dispersed without caking. The glass rod is removed and the measuring cylinder is placed on a table with a rubber mat and vibrates to make the resin packed compactly. After standing for 24 hours, the volume is recorded and swelling degree is calculated.

The results are shown in Table 1:

TABLE 1

Swelling degree tests of resin

| | Example 1 | Example 2 | Example 3 | Example 4 | Example 5 | Example 6 | Example 7 | Example 8 | Example 9 |
|---|---|---|---|---|---|---|---|---|---|
| Swelling degree in acetonitrile (ml/g) | 3.7 | 3.9 | 3.4 | 3.7 | 3.6 | 3.8 | 3.8 | 3.7 | 3.9 |
| Swelling degree in toluene (ml/g) | 5.5 | 6.2 | 4.9 | 5.1 | 5.0 | 5.4 | 5.4 | 5.4 | 5.9 |

Example 11

Properties of the solid phase synthetic carriers prepared in the examples and the NittoPhase HL solid phase synthetic carriers are evaluated. To better show the advantages of the present invention, the loading amount (g) of carriers=synthetic column volume (ml)/swelling degree of carrier in toluene (ml/g), and the wash volume is limited to the volume of one synthetic column during the synthesis of oligonucleotides.

10 g of the solid phase synthesis carrier is weighed in a reactor and swollen in 50 ml of acetonitrile for 10 min, and then an appropriate amount of DMT-dT-3'-succinic acid, HBTU and DIEA are added thereto to carry out reaction at room temperature for 12 h. After the reaction is completed, wash 5 times with acetonitrile. Then Cap A (consisting of 20 ml of acetonitrile, 7.5 ml of pyridine and 5.0 ml of N-methylimidazole) and Cap B (consisting of 10 ml of acetonitrile and 4 ml of acetic anhydride) are added to carry out reaction at room temperature for 30 min. After the reaction is completed, the resin is washed 5 times with acetonitrile and dried under vacuum to obtain the carrier loaded with DMT-dT. The loaded DMT groups are removed using p-toluenesulfonic acid/acetonitrile solution. Contents of the DMT group loaded in the carrier are determined by spectrophotometry at 412 nm, and the results are shown in Table 2.

The carriers loaded with DMT-dT are weighed and filled in a synthesis column (32 ml). The synthesis column is mounted on AKTA OligoPilot 100 to synthesize an oligonucleotide with 20 bases in length having a sequence of d[ACGTACGTACGTACGTACGT]. The synthesis process is as follows: 1. Swell the resin in dichloromethane; 2. Remove DMT groups with 10% DCA/DCM; 3. Wash with anhydrous acetonitrile; 4. Add phosphoramidite monomer and activating reagent to carry out condensation; 5. Wash with anhydrous acetonitrile; 6. Add oxidizing agent to carry out oxidation; 7. Wash with anhydrous acetonitrile; 8. Add capping reagent to carry out end capping; 9. Wash with anhydrous acetonitrile; and 10. Repeat the step 2 to start the next cycle.

After the synthesis is completed, the carriers are taken out for drying. Then they are put into a glass bottle, and an appropriate amount of concentrated ammonia water is added thereto to carry out reaction at 55° C. for 16 h, so that the oligonucleotides are cleaved from the carriers while the protecting groups on the bases are removed. The carrier and oligonucleotide are separated via filtration, and the filtrate is dried to obtain a crude powder of oligonucleotide. Purity of the oligonucleotide is measured by HPLC and yield of the oligonucleotide is calculated. The results are shown in Table 2.

| | Example 1 | Example 2 | Example 3 | Example 4 | Example 5 | Example 6 | Example 7 | Example 8 | Example 9 | Nitto Phase HL |
|---|---|---|---|---|---|---|---|---|---|---|
| Amount of DMT-dT-3'-succinic acid (g) | 2.8 | 2.2 | 1.4 | 2.8 | 3.5 | 2.8 | 0.8 | 3.5 | 2.8 | — |
| Amount of HBTU (g) | 1.4 | 1.1 | 0.7 | 1.4 | 1.8 | 1.4 | 0.4 | 1.8 | 1.4 | |
| Amount of DIEA (ml) | 1.3 | 1.0 | 0.7 | 1.3 | 1.6 | 1.3 | 0.4 | 1.6 | 1.3 | |
| Content of DMT group (μmmol/g) | 318 | 241 | 133 | 298 | 408 | 315 | 72 | 392 | 328 | 321* |
| Swelling degree in toluene (ml/g) | 5.5 | 6.2 | 4.9 | 5.1 | 5.0 | 5.4 | 5.4 | 5.4 | 5.9 | 5.8 |
| Loading amount of the carrier (g) | 5.8 | 5.1 | 6.5 | 6.3 | 6.4 | 5.9 | 5.9 | 5.9 | 5.4 | 5.5 |

-continued

| | Example 1 | Example 2 | Example 3 | Example 4 | Example 5 | Example 6 | Example 7 | Example 8 | Example 9 | Nitto Phase HL |
|---|---|---|---|---|---|---|---|---|---|---|
| HPLC Purity (%) | 85.4 | 86.2 | 81.9 | 82.3 | 81.4 | 86.3 | 84.2 | 83.0 | 83.5 | 79.5 |
| Yield (%) | 65.1 | 64.9 | 60.9 | 62.7 | 63.2 | 66.3 | 64.1 | 63.5 | 64.3 | 60.3 |

Note:
*NittoPhase HL loading UnyLinker.

As can be seen from Table 2, the use of the oligonucleotide solid phase synthesis carrier of the present invention can improve the yield and purity of oligonucleotides and thus help reduce the production cost of oligonucleotides.

The above examples and technical solutions are only for preferred embodiments of the present invention. It should be pointed out that for those skilled in the art, any changes or alterations derived from the spirit of the present invention are still within the protection scope of the present invention.

The inventino claimed is:

1. A porous resin for solid phase synthesis, wherein the porous resin has a polymer skeleton with functional groups which is represented by the following formula:

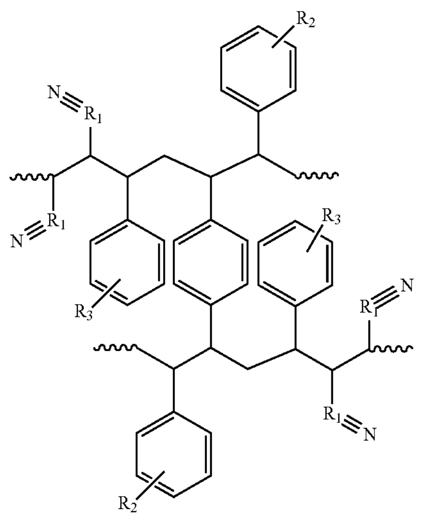

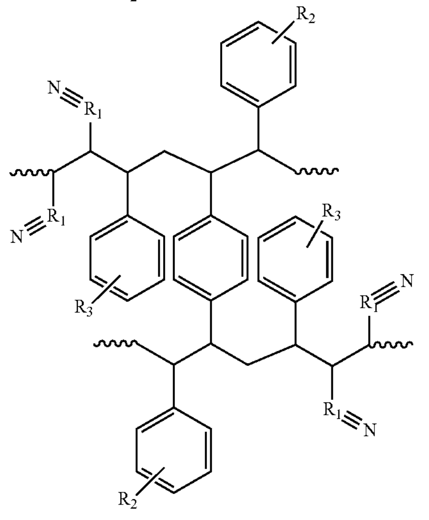

wherein, $R_1$=—C — or —C—$CH_2$—, $R_2$=—OH, —$CH_2OH$, —$NH_2$, —$CH_2NH_2$, —$CH_2OOC$—$C_6H_4$—OH, —$CH_2OOCCH_2$—$C_6H_4$—OH, —$(CH_2)_4OOC$—$C_6H_4$—OH, —$(CH_2)_4OOCCH_2$—$C_6H_4$—OH, —COONH—$C_6H_4$—$NH_2$, —$CH_2COONH$—$C_6H_4$—$NH_2$, —COO—$C_6H_4$—OH or —$CH_2COO$—$C_6H_4$—OH; and $R_3$=—H; or $CH_3(CH_2)_n$—, n is an integer of 0-4; or $(CH_3)_2CH(CH_2)_n$, n is an integer of 0-2; or $(CH_3)_3C$—; or $CH_3CH_2CH(CH_3)$—; or $CH_3CH_2C(CH_3)_2$—; or $CH_3CH_2CH_2CH(CH_3)$—; or $CH_3(CH_2)_n$—O—, n is an integer of 0-4.

2. The porous resin for solid phase synthesis according to claim 1, wherein the porous resin has a content of hydroxyl group or amino group of 100-1000 μmol/g.

3. The porous resin for solid phase synthesis according to claim 1, wherein the porous resin has a particle size in a range of 35-200 μm.

4. The porous resin for solid phase synthesis according to claim 1, wherein the porous resin has an average pore diameter of 10-200 nm.

5. The porous resin for solid phase synthesis according to claim 1, wherein the porous resin is a copolymer comprising repeating structural units represented by formula (I), formula (II), formula (III), and formula (IV) in its skeleton:

(I)

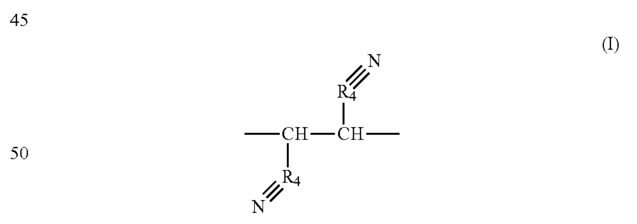

wherein, $R_4$=—C— or —C—CH2—;

(II)

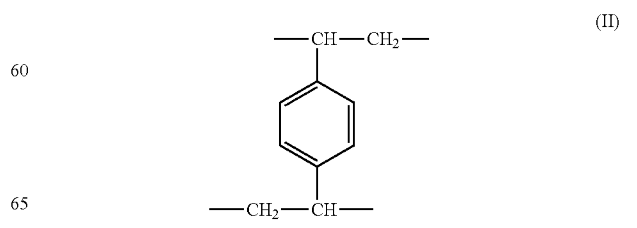

-continued (III)

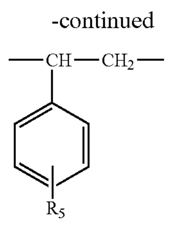

wherein, $R_5$ is selected from the group consisting of —OH, —$CH_2OH$, —$NH_2$, —$CH_2NH_2$, —$CH_2OOC$—$C_6H_4$—OH, $H_2OOCCH_2$—$C_6H_4$—OH, —$(CH_2)_4$OOC—$C_6H_4$—OH, —$(CH_2)_4OOCCH_2$—$C_6H_4$—OH, —COONH—$C_6H_4$—$NH_2$, —$CH_2$COONH—$C_6H_4$—$NH_2$, —COO—$C_6H_4$—OH and —$CH_2$COO—$C_6H_4$—OH;

(IV)

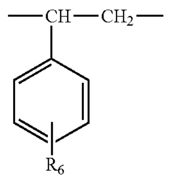

wherein, $R_6$ is —H; or $CH_3(CH_2)_n$—, n is an integer of 0-4; or $(CH_3)_2CH(CH_2)_n$—, n is an integer of 0-2; or $(CH_3)_3C$—; or $CH_3CH_2CH(CH_3)$—; or $CH_3CH_2C(CH_3)_2$—; or $CH_3CH_2CH_2CH(CH_3)$—; or $CH_3(CH_2)_n$—O—, n is an integer of 0-4.

6. The porous resin for solid phase synthesis according to claim 1, wherein the porous resin has a content of hydroxyl group or amino group of 400-700 μmol/g, a particle size in a range of 50-100 μm, or an average pore diameter of 40-100 nm.

7. A preparation method of the porous resin for solid phase synthesis according to claim 1, comprising following steps of:

A, preparing an aqueous phase and an oil phase, respectively; the aqueous phase comprising: water, a dispersant and an inorganic salt; the oil phase comprising: a monovinyl compound, a crosslinking monomer, a functional monomer, a modified monomer, an oil-soluble surfactant, a diluent and an initiator, wherein, the monovinyl compound, the crosslinking monomer, the functional monomer and the modified monomer are monomers capable of polymerization; the oil-soluble surfactant and the diluent are incapable of polymerization but act as pore-forming agents for pore forming;

B, adding the oil phase to the aqueous phase, stirring and heating to carry out reaction, and removing the pore-forming agents after the reaction is completed, obtaining a porous polymer resin.

8. The preparation method according to claim 7, wherein the porous polymer resin is capable of undergoing a further reaction to obtain a porous resin containing a hydroxyl group or an amino group as functional groups.

9. The preparation method according to claim 7, wherein the monovinyl compound is styrene, unsubstituted or substituted with C1-C5 alkyl or alkoxy on its benzene ring.

10. The preparation method according to claim 7, wherein the crosslinking monomer is divinylbenzene.

11. The preparation method according to claim 7, wherein the functional monomer is selected from the group consisting of hydroxystyrene and derivatives thereof, hydroxyalkyl styrene and derivatives thereof; acyloxy styrene and derivatives thereof; amino styrene and derivatives thereof; aminoalkyl styrene and derivatives thereof; haloalkyl styrene monomers; 4-vinylphenyl ester monomers.

12. The preparation method of the porous resin for solid phase synthesis according to claim 7, wherein the modified monomer is selected from the group consisting of fumaronitrile and 1,4-dicyano-2-butene.

13. The preparation method according to claim 7, wherein the initiator is selected from the group consisting of benzoyl peroxide, lauroyl peroxide, tert butyl peroxy-2-ethylhexanoate, 2,2'-azobis(2-methylpropionitrile), 2,2'-azobis(2-methylbutyronitrile) and 2,2'-azobis(2,4-dimethyl)valeronitrile.

14. The preparation method according to claim 7, wherein the oil-soluble surfactant is selected from the group consisting of sorbitan trioleate, polyoxyethylene sorbitol beeswax derivative, sorbitan tristearate, polyoxyethylene sorbitol hexastearate, ethylene glycol fatty acid ester, propylene glycol fatty acid ester, propylene glycol monostearate, sorbitan sesquioleate, polyoxyethylene sorbitol oleate, monostearin, lanolin hydroxylated, sorbitol monooleate, propylene glycol laurate, and any combinations thereof.

15. The preparation method according to claim 7, wherein the diluent is selected from the group consisting of aromatic hydrocarbons; halogenated hydrocarbons; esters containing 4 or more carbon atoms; alcohols.

16. The preparation method according to claim 7, wherein, the dispersant is present in the aqueous phase in an amount of 0.1-5% by weight, and the inorganic salt is present in the aqueous phase in an amount of 20% by weight or lower;

a weight ratio of the oil phase to the aqueous phase is 1:3-1:20;

the monovinyl compound in the oil phase accounts for 40-95.9%, by weight based on a total weight of the monomers;

the crosslinking monomer in the oil phase accounts for 2-20%, by weight based on a total weight of the monomers;

the functional monomer in the oil phase accounts for 2-20%, by weight based on a total weight of the monomers;

the modified monomer in the oil phase accounts for 0.1-20%, by weight based on a total weight of the monomers;

the pore-forming agents in the oil phase account for 15-70%, by weight based on a total weight of the monomers;

the oil-soluble surfactant in the pore-forming agents accounts for 0.1-15% by weight based on a total weight of the pore-forming agents; and the diluent in the pore-forming agents accounts for 85-99.9% by weight based on a total weight of the pore-forming agents.

17. The preparation method according to claim 7, wherein the polymerization is carried out at a temperature of 50-90° C.

18. The preparation method according to claim 7, comprising following steps of:

adding a certain amount of purified water to a reactor, adding the dispersant in an amount which is 0.1-5% by weight of the aqueous phase and the inorganic salt in an amount which is not more than 20% by weight of the aqueous phase, and dissolving to obtain the aqueous phase;

weighing out the monovinyl compound, crosslinking monomer, functional monomer, modified monomer, pore-forming agents and initiator according to a weight ratio of the oil phase to the aqueous phase being 1:3-1:20; wherein, the monovinyl compound accounts for 40-95.9% of the total weight of the monomers; the crosslinking monomer accounts for 2-20% of the total weight of the monomers, the functional monomer accounts for 2-20% of the total weight of the monomers, and the modified monomer accounts for 0.1-20% of the total weight of the monomers; the pore-forming agents account for 15-70% of the total weight of the monomers; the oil-soluble surfactant in the pore-forming agents accounts for 0.1-15% of the weight of the pore-forming agents; and the diluent accounts for 85-99.9% of the weight of the pore-forming agents, and mixing well to obtain the oil phase;

adding the oil phase to the reactor, stirring and heating to 50-90° C. to carry out reaction; removing the pore-forming agents after the reaction is completed, screening and collecting a resin with appropriate particle size, and vacuum drying to obtain a porous polymer resin;

carrying out a further reaction with the resin to obtain a porous resin having amino group or carboxyl group.

19. The preparation method according to claim 7, comprising the following steps of:

adding 2 L purified water, 20 g polyvinyl alcohol and 60 g sodium chloride to a 3 L reactor equipped with a condenser, an agitator and a thermometer, and dissolving to obtain an aqueous phase;

weighing out 110 g styrene, 10 g divinylbenzene having a purity of 80% by weight, 12 g p-chloromethyl styrene, 8 g fumaronitrile, 5 g sorbitol monooleate, 45 g isooctanol and 2.5 g benzoyl peroxide, and mixing well to obtain an oil phase;

adding the oil phase to the reactor, stirring, and heating to 80° C. to carry out polymerization for 4 h; washing with hot water after the polymerization is completed, removing the pore-forming agents by ethanol reflux extraction, screening and collecting resin with a particle size of 50-100 μm and vacuum drying to obtain a polymer porous resin with a chlorine content of 550 μmol/g;

adding 50 g of the polymer porous resin and 500 ml N,N-dimethylformamide to a 1L reactor equipped with a condenser, an agitator and a thermometer, and stirring; then adding 30 g potassium phthalimide and raising the temperature to 95° C. to carry out reaction for 16 hours; cooling to room temperature after reaction is completed, washing twice with N,N-dimethylformamide, washing to neutral with purified water, washing three times with absolute ethanol, and filtering and drying the resin; adding 200 g absolute ethanol and 50 g hydrazine hydrate to the reactor, raising the temperature to 75° C. and reacting for 16 hours; thereafter washing three times with ethanol/purified water solution with a volume ratio of 50:50, washing with purified water to neutral, washing three times with absolute ethanol, and filtering and drying, adding 200 g absolute ethanol and 50 g concentrated hydrochloric acid to the reactor, raising the temperature to 60° C. and reacting for 6 h, thereafter cooling to room temperature, washing to neutral with water, and then vacuum drying to obtain a solid phase synthesis carrier with an amino content of 543 μmol/g and an average pore diameter of 48 nm measured by mercury intrusion method.

20. The preparation method according to claim 7, comprising the following steps of:

adding 2 L purified water, 20 g polyvinyl alcohol and 60 g sodium chloride to a 3 L reactor equipped with a condenser, an agitator and a thermometer and dissolving to obtain an aqueous phase;

weighing out 111 g styrene, 11 g divinylbenzene having a purity of 80% by weight, 13 g 4-acetoxystyrene, 5 g fumaronitrile, 8 g sorbitol monooleate, 40 g isooctanol, 20 g isododecane and 2.5 g benzoyl peroxide, and mixing well to obtain an oil phase;

adding the oil phase to the reactor, stirring, and raising the temperature to 78° C. to carry out polymerization for 6 h; thereafter washing the resin with hot water, removing the pore-forming agents by ethanol reflux extraction, screening and collecting the resin with a particle size of 50-100 μm and vacuum drying to obtain a polymer porous resin;

adding 50 g of the polymer porous resin and 300 ml acetonitrile to a 1 L reactor equipped with a condenser, an agitator and a thermometer, and stirring; adding 7.5 ml hydrazine hydrate slowly and reacting for 3 h at room temperature; thereafter washing to neutral with water, and then vacuum drying to obtain a solid phase synthesis carrier having a hydroxyl group content of 550 μmol/g and an average pore diameter of 64 nm measured by mercury intrusion method.

* * * * *